US011409729B2

(12) United States Patent
Cai et al.

(10) Patent No.: US 11,409,729 B2
(45) Date of Patent: Aug. 9, 2022

(54) MANAGING DATABASE OBJECT SCHEMA VIRTUAL CHANGES

(71) Applicant: INTERNATIONAL BUSINESS MACHINES CORPORATION, Armonk, NY (US)

(72) Inventors: Ke Ke Cai, Beijing (CN); Zhong Su, Beijing (CN); Bing Jiang Sun, Beijing (CN); Shuang YS Yu, Beijing (CN); Shi Wan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

(21) Appl. No.: 15/829,862

(22) Filed: Dec. 1, 2017

(65) Prior Publication Data

US 2019/0171738 A1 Jun. 6, 2019

(51) Int. Cl.
G06F 16/23 (2019.01)
G06F 16/21 (2019.01)
G06F 16/2455 (2019.01)
G06F 16/248 (2019.01)

(52) U.S. Cl.
CPC ........ *G06F 16/2365* (2019.01); *G06F 16/211* (2019.01); *G06F 16/213* (2019.01); *G06F 16/248* (2019.01); *G06F 16/2455* (2019.01)

(58) Field of Classification Search
CPC ............. G06F 16/2365; G06F 16/2455; G06F 16/213; G06F 16/248; G06F 16/211
See application file for complete search history.

(56) References Cited

U.S. PATENT DOCUMENTS 8,862,588 B1 * 10/2014 Gay ..................... G06F 16/2272
707/741
9,251,184 B2 2/2016 Harris
(Continued)

FOREIGN PATENT DOCUMENTS

WO 02/103573 A1 12/2002

OTHER PUBLICATIONS

Oracle, "Enterprise Manager Lifecycle Management Administrator's Guide," Managing Database Schema Changes, Jul. 2017, pp. 1-31.
(Continued)

*Primary Examiner* — Kannan Shanmugasundaram
(74) *Attorney, Agent, or Firm* — Intelletek Law Group, PLLC; Gabriel Daniel, Esq.

(57) ABSTRACT

A virtual change database system that supports iterative and parallel database application development is disclosed. The system stores a common set of base physical data and a plurality of sets of virtual changes. Each set of virtual changes is associated with a database object. A database application may access a database object in the database by using the virtual version of the object to extract the object's data content from the common base physical data. The database system present a first query response to (i) a first application based on the set of base physical data and (ii) a first set of virtual changes for a particular database object, while also presenting a second query response to a second application based on the set of base physical data and a second, different set of virtual changes for the particular database object.

18 Claims, 9 Drawing Sheets

(56) References Cited

U.S. PATENT DOCUMENTS

| | | | | |
|---|---|---|---|---|
| 2006/0101005 A1* | 5/2006 | Yang | ............ | G06Q 30/02 |
| | | | | 707/999.003 |
| 2006/0253500 A1* | 11/2006 | Kapur | ............ | G06F 16/273 |
| | | | | 707/999.2 |
| 2011/0173168 A1* | 7/2011 | Jones | ............ | G06F 16/88 |
| | | | | 707/695 |
| 2013/0054531 A1* | 2/2013 | Susairaj | ............ | G06F 16/217 |
| | | | | 707/640 |
| 2013/0262399 A1* | 10/2013 | Eker | ............ | G06F 16/213 |
| | | | | 707/687 |
| 2016/0140176 A1 | 5/2016 | Chamberlin et al. | | |
| 2017/0139995 A1 | 5/2017 | Mielenhausen | | |

OTHER PUBLICATIONS

IBM, "Managing database object changes by using the Properties view," IBM Knowledge Center, Jul. 2017, 1 page.

\* cited by examiner

MANAGING DATABASE OBJECT SCHEMA VIRTUAL CHANGES

BACKGROUND

Technical Field

The present disclosure generally relates to database management and database application development.

Description of the Related Art

A database application is a computer program whose primary purpose is entering and retrieving information from a computerized database. A characteristic of modern database applications is that they facilitate simultaneous updates and queries from multiple users. Information would be pulled from the database, transmitted over a network, and then arranged, graphed, or otherwise formatted by the program running on a personal computer.

SUMMARY

Some embodiments of the disclosure provide a virtual change database system that supports iterative and parallel database application development. The system stores a common set of base physical data and a plurality of sets of virtual changes. Each set of virtual change is associated with a database object. In some embodiments, the virtual change database system maintains a catalog of virtual versions in addition to the common base physical data. Each virtual version references a set of database objects in the database and includes metadata of the virtual change of the referenced database objects. A database application may access a database object in the database by using the virtual version of the object to extract the object's data content from the common base physical data.

The database system may present a first query response to a first application based on the set of base physical data and a first set of virtual changes for a particular database object while also presenting a second query response to a second application based on the set of base physical data and a second, different set of virtual changes for the particular database object. The virtual change database system may receive a change request to the database system from the first application that affects the particular object, create a third set of virtual changes for the particular object based on the received change request, and presents a third query response based on the set of base physical data and the third set of virtual changes for the particular object. The database system may create the third set of virtual changes for the particular object by generating a delta metadata based on the received change request and merging the generated delta metadata with a metadata of a database object.

In some embodiments, a set of virtual changes for a database object includes changes to schema of the database stored as a virtual version of the database object. A virtual version of a database object may include (i) references to a set of other objects in the database and (ii) metadata of the referenced objects. The set of virtual changes for a database object may further include changes to data content of the database stored as a set of temporary physical data.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
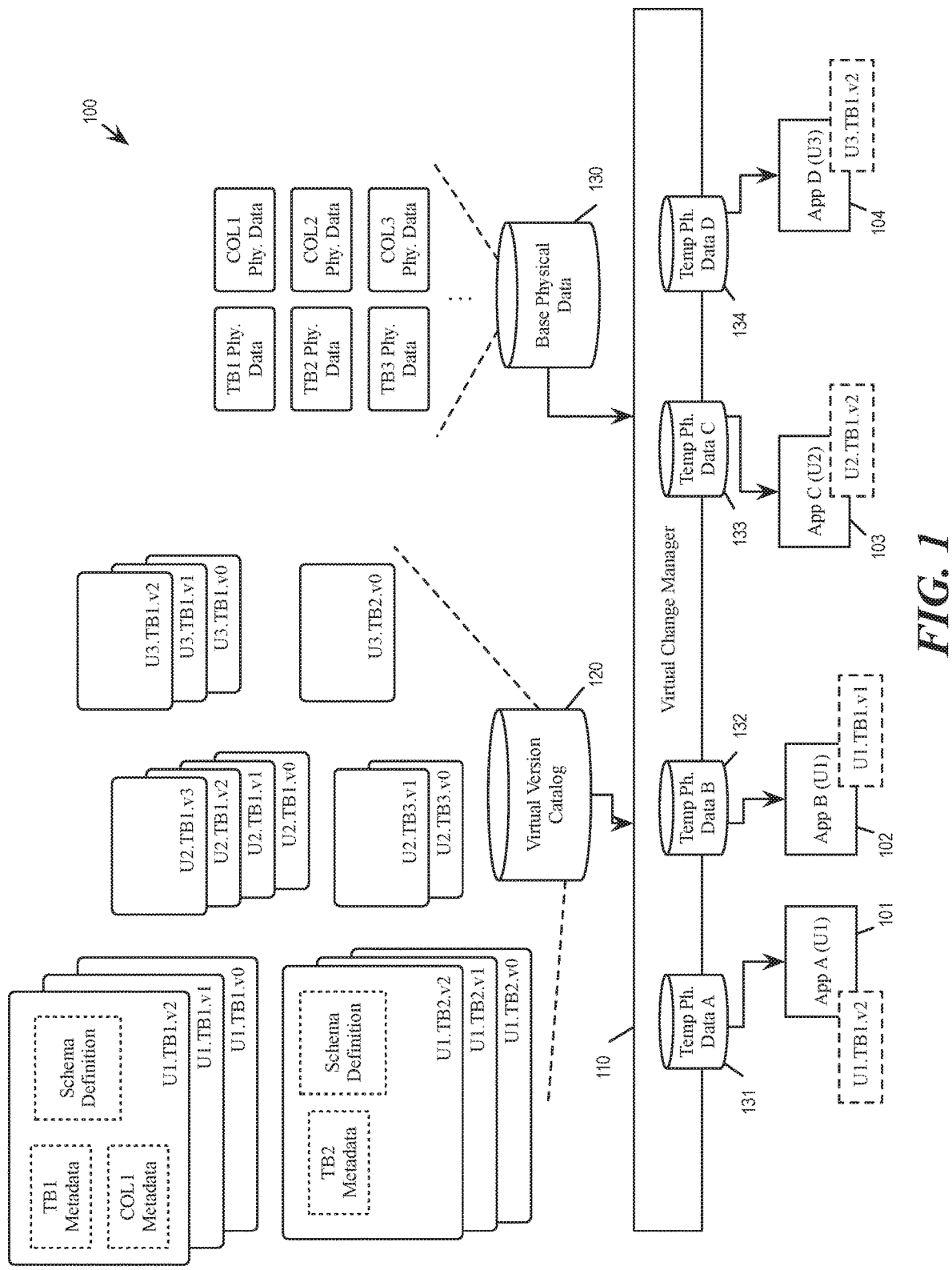
FIG. 1 conceptually illustrates a virtual change database system, consistent with an exemplary embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Development of large-scale relational database applications generally involves iterative and parallel database application development. To support iterative and parallel database application development, a development center typically maintains several separate sets of database systems that may implement the same set of objects but with different schemas. (For example, database application A requires TABLE_A to have columns COL1, COL2 and COL3, while database application B requires TABLE_A to only have columns COL1 and COL2. In this situation, two sets of database systems for TABLE_A are used to support the parallel development of application A and B.) These separate database systems have separate sets of physical tables, which allow different developers and/or different application programs to interact or make changes to their copies of the database system without affecting each other.

Implementing such a database system can pose significant challenges to constraints on cost. Making database schema changes can be a very time-consuming process that involves massive data movement. Furthermore, a large data center may easily run out of physical storage because each database application development has to store its own duplicate of the physical data. An alternative is to maintain only one common set of underlying physical tables but allow multiple different views of the common physical tables under different schemas. Such a view-based database does not permit physically segregated development and testing of applications in parallel. Operations such as insert, update, and delete within a particular view of the database involve changes to the underlying physical table. Furthermore, a developer cannot add a new database object (such as a column) that doesn't already have corresponding content in the underlying physical tables.

Some embodiments of the disclosure provide a virtual change database system that supports iterative and parallel database application development. The system stores a common set of base physical data and a plurality of sets of virtual changes. Each set of virtual change is associated with a database object. In some embodiments, the virtual change database system maintains a catalog of virtual versions in addition to the common base physical data. Each virtual version references a set of database objects in the database and includes metadata of the virtual change of the referenced database objects. A database application may access a database object in the database by using the virtual version of the object to extract the object's data content from the common base physical data.

The database system may present a first query response to a first application based on the set of base physical data and a first set of virtual changes for a particular database object while also presenting a second query response to a second application based on the set of base physical data and a second, different set of virtual changes for the particular database object. The virtual change database system may receive a change request to the database system from the first application that affects the particular object, create a third set of virtual changes for the particular object based on the received change request, and presents a third query response based on the set of base physical data and the third set of virtual changes for the particular object. The database system may create the third set of virtual changes for the particular object by generating a delta metadata based on the received change request and merging the generated delta metadata with a metadata of a database object.

In some embodiments, a set of virtual changes for a database object includes changes to a schema of the database stored as a virtual version of the database object. A virtual version of a database object may include (i) references to a set of other objects in the database and (ii) metadata of the referenced objects. The set of virtual changes for a database object may further include changes to data content of the database stored as a set of temporary physical data.

FIG. 1 conceptually illustrates a virtual change database system 100, consistent with an exemplary embodiment. The virtual change database system provides virtual versions of database objects to several concurrent database applications 101-104 (database applications A, B, C, and D). A virtual change manager 110 extracts the virtual versions based on a set of base physical data 130 and a catalog of virtual version 120. For each of the database applications 101-104, the virtual change manager 110 also maintains a set of temporary physical data specific to the database application (temporary physical data 131-134 for database applications 101-104, respectively.)

In some embodiments, a computing device (e.g., a server) implements the virtual change manager 110. The virtual change manager 110 may be implemented as a module of software instructions being executed by one or more processing units (e.g., a processor) of the computing device. In some embodiments, the virtual change manager 110 is implemented as a module of hardware circuits implemented by one or more integrated circuits (ICs) of an electronic apparatus. In some embodiments, the set of base physical data 130, the catalog of virtual version 120, and the temporary physical data 131-134 are data stored in a common storage device associated with the computing device implementing the virtual change manager 110. In some embodiments, the set of base physical data 130, the catalog of virtual version 120, and the temporary physical data 131-134 are stored in remote storage devices reachable by the virtual change manager 110 over the Cloud.

The set of base physical data 130 includes the bulk of the stored data of the database. The set of base physical data 130 may also be stored (and therefore be referred to) as a base physical table. The base physical data 130 is commonly shared by all database applications 101-104, i.e., any changes made to the set of base physical data 130 may affect the database objects (or their virtual versions) seen by all database applications 101-104. The set of base physical data are the basis of all virtual versions of the database system 100. In other words, all virtual versions are stored as virtual changes (in schema or in data content) with respect to the set of base physical data 130.

The set of base physical data 130 stores physical copies of database objects such as tables, columns, rows, cells, etc. The physical data also stores their corresponding data content. In the example illustrated in FIG. 1, the database set of base physical data 130 physically stores data content for database objects such as tables (TB1, TB2, TB3, etc.) and columns (COL1, COL2, and COL3, etc.).

The catalog of virtual versions 120 is a catalog that registers or stores various virtual versions for various database objects. In the example illustrated, the catalog 120 includes virtual versions for database objects TB1, TB2, and TB3. Some of these database objects have several different virtual versions that are created by or for different users. For example, the user U1 has three versions for TB1 (U1.TB1.v0, U1.TB1.v1, U1.TB1.v2) and three versions for TB2 (U1.TB2.v0, U1.TB2.v1, and U1.TB2.v2). The user U2 has four versions for TB1 (U2.TB1.v0, U2.TB1.v1, U2.TB1.v2, and U2.TB1.v3) and two versions for TB3 (U2.TB3.v0, U2.TB3.v1).

For each virtual version of an object, the catalog 120 stores a definition that defines the scope of the virtual version. Such a scope is based on the virtual changes that have to be made with respect to the base physical data in order to produce the virtual version. Specifically, the virtual version definition identifies which database objects are involved in the virtual change as well as what changes have to be made with regard to those database objects to produce the virtual version. In some embodiments, each virtual version in the catalog includes (i) references to a set of database objects and (ii) metadata for the referenced database objects. Different versions may reference the same database object while keeping different metadata for that same database object.

Figure 5:
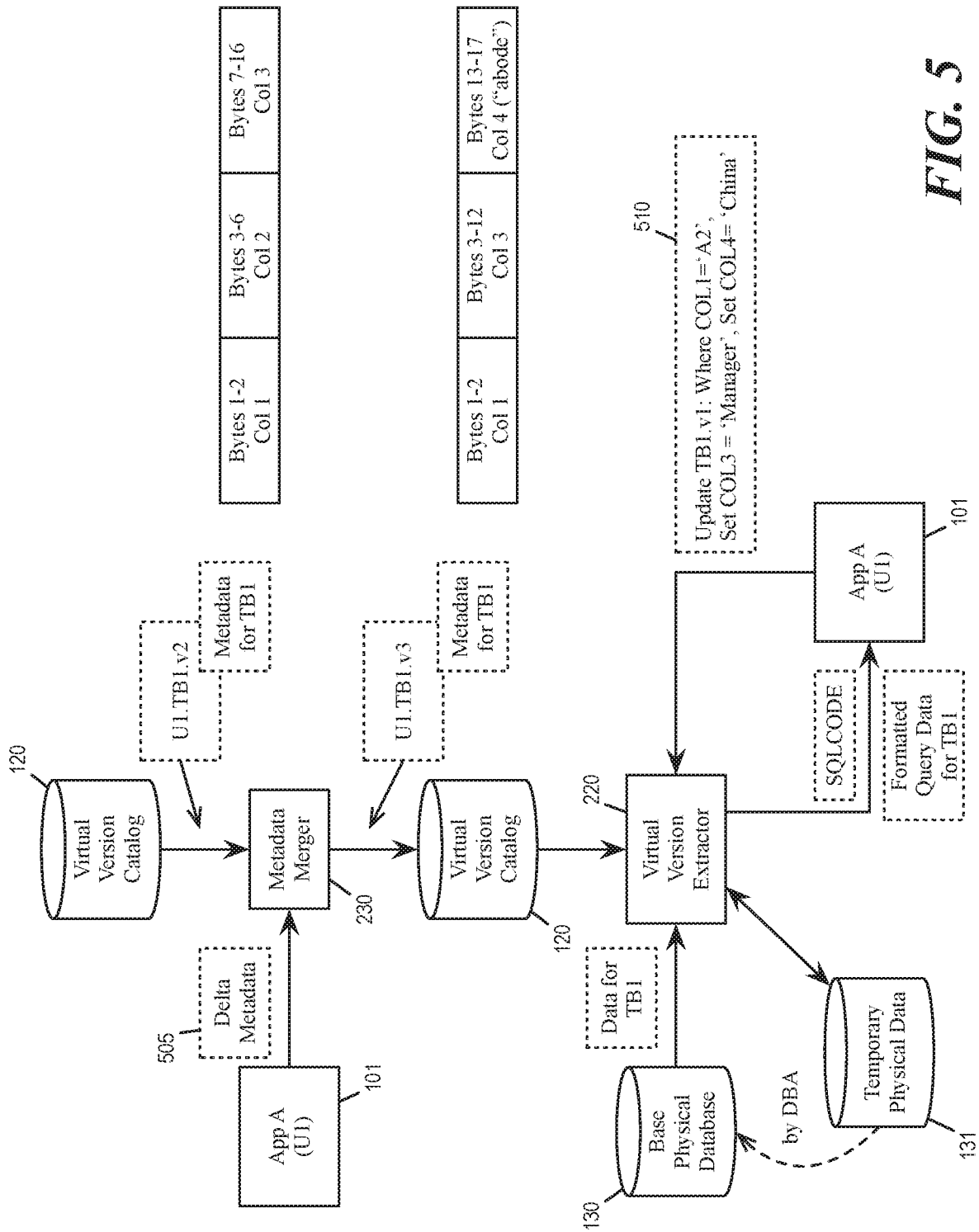
FIG. 5 illustrates example operations of the virtual change database system with example metadata in virtual versions.
Figure 6:
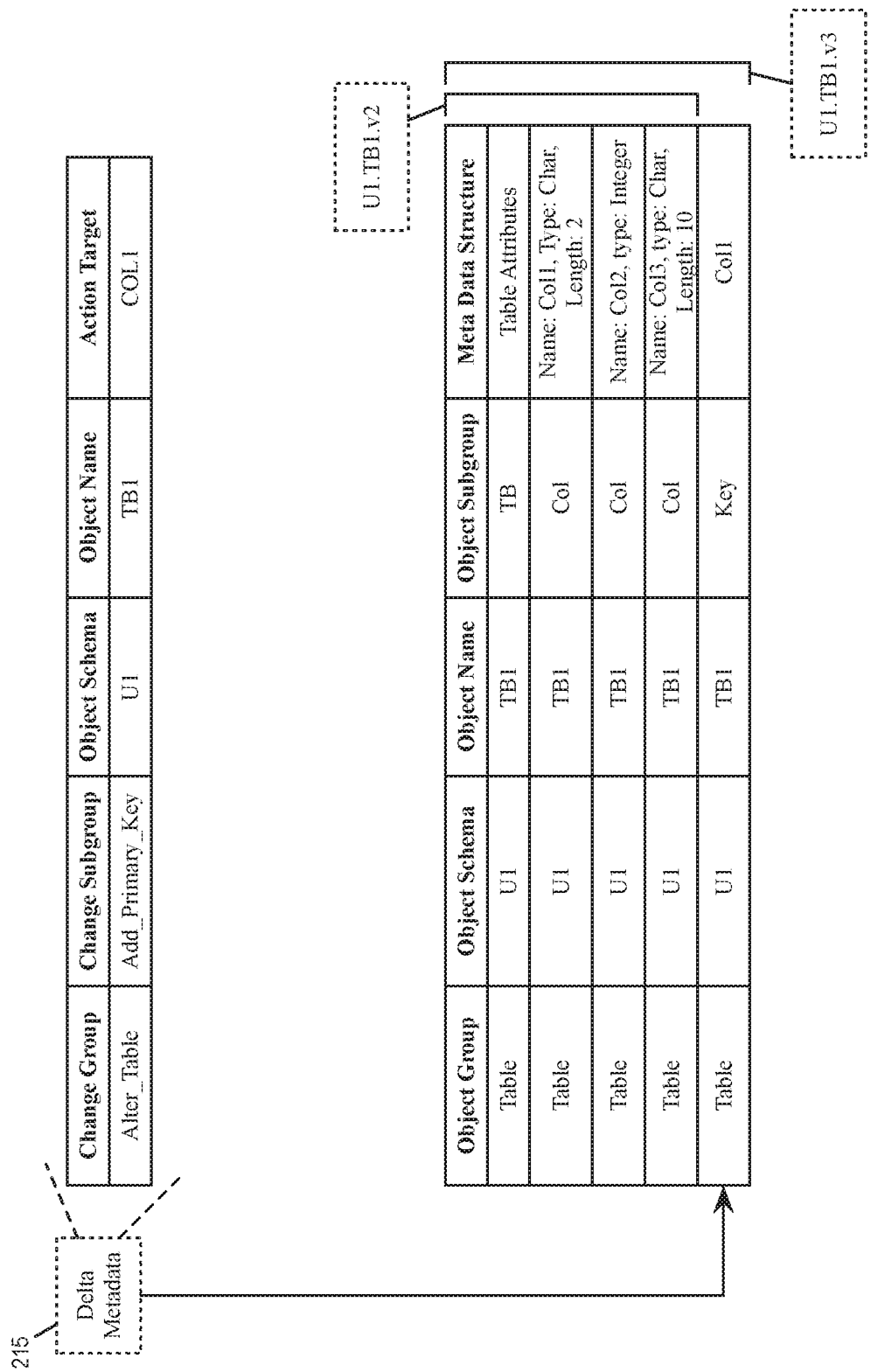
FIG. 6 illustrates the generation of a new virtual version based on example delta metadata, consistent with an exemplary embodiment.

In the illustrated example, the virtual version "U1.TB1.v2" includes metadata for both objects TB1 and COL1, specifying the virtual changes required to construct/extract the virtual version U1.TB1.v2 from data objects TB1 and COL1. On the other hand, the virtual version U2.TB2.v2 includes metadata for objects TB2 only, specifying the virtual changes involved to construct/extract the virtual version U2.TB2.v2 from the object TB2. FIG. 5 and FIG. 6 provide illustrative examples of virtual versions in greater detail.

The virtual change manager 110 manages the update of the catalog 120 and the base physical data 130. The virtual change manager 110 also retrieves content from the catalog 120 and the base physical data 130 and performs operations to generate/extract virtual versions from the retrieved data. The virtual change manger 110 receives requests from the database applications 101-104 for various different virtual versions. The virtual change manager 110 in turn provides virtual versions specific to the request of each database application.

The database applications 101-104 are applications that may concurrently access or make changes to the database system 100. The applications 101-104 may include separate and concurrent database development efforts that create different schemas for the database 100. The applications 101-104 may also include separate and concurrent database verification efforts that test entry and query of the database content. The applications 101-104 may be of different users (uses U1, U2, and U3) each implementing its own set of virtual versions. The applications 101-104 may also represent different stages of a common development effort, for example, the application 101 (App A) may be developing a new virtual version of TB1 (U1.TB1.v2), while the application 102 (App B) is working on an older virtual version of TB1 (U1.TB1.v1).

Different database applications (or development effort) may make changes to their own virtual versions without modifying the content of the common base physical data 130. Different database applications may also add new database objects that may or may not have corresponding content in the common base physical table 130. The virtual change database system stores changes made to the schema of the database as virtual versions in the catalog 120.

Figure 2:
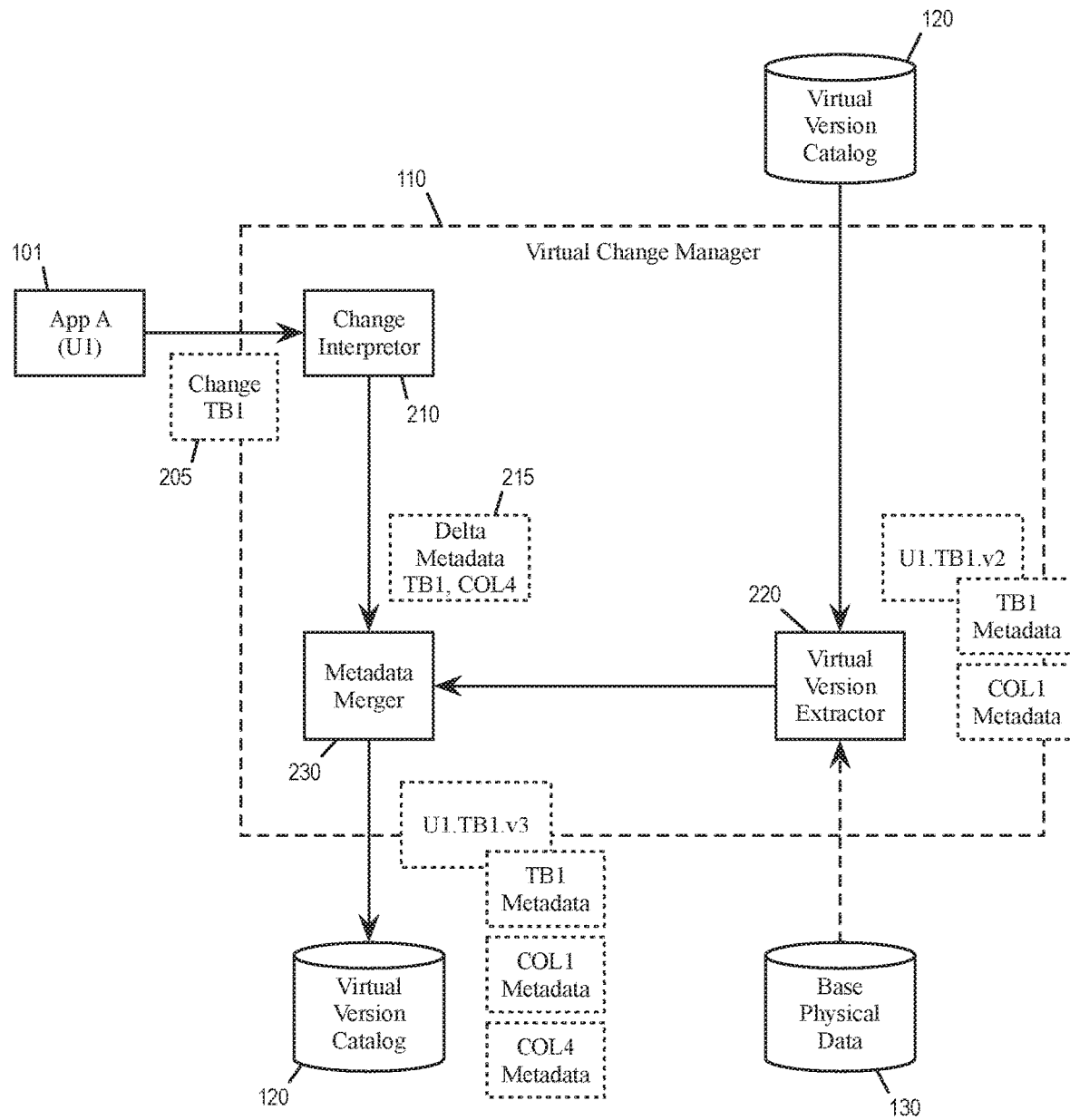
FIG. 2 conceptually illustrates the creation of a new virtual version based on an existing virtual version, consistent with an exemplary embodiment.

FIG. 2 conceptually illustrates the creation of a new virtual version based on an existing virtual version, consistent with an exemplary embodiment. As illustrated, the virtual change manager 110 receives a request 205 from the application 101 (App A) for modifying the database object TB1. The modification includes adding a new object COL4 into the TB1. This COL4 has no corresponding data content in the set of base physical data 130.

A change interpreter 210 interprets the change request 205 and generates a delta or differential metadata 215, which specifies metadata for database objects TB1 and COL4. A virtual version extractor 220 extracts a virtual version (e.g., latest virtual version) for the object TB1 for the user U1. This virtual version (U1.TB1.v2) has metadata for objects TB1 and COL1 but not COL4. A metadata merger 230 merges the delta metadata 215 with the extracted virtual version U1.TB1.v2 to create the new virtual version U1.TB1.v3. This new virtual version U1.TB1.v3 has metadata for TB1, COL1, and the newly added COL4. The virtual change manager 110 registers the new virtual version U1.TB1.v3 with the catalog 120.

As illustrated in FIG. 1 above, the application 101 (App A) is working on virtual version of TB1 (U1.TB1.v2) while the application 102 (App B) is working on an older virtual version of TB1 (U1.TB1.v1). After the application 101 made changes to U1.TB1.v2 to create U1.TB1.v3, the new virtual version U1.TB1.v3 become available for testing or operation. The modification of U1.TB1.v2 (or creation of U1.TB1.v3) does not affect operations based on U1.TB1.v1. The application 102 (App B) may continue to work on virtual version U1.TB1.v1 without disruption. The application 102 may also switch to work on U1.TB1.v2 or U1.TB1.v3 (by e.g., setting a global variable). No changes are made to the set of base physical data 130.

Figure 3:
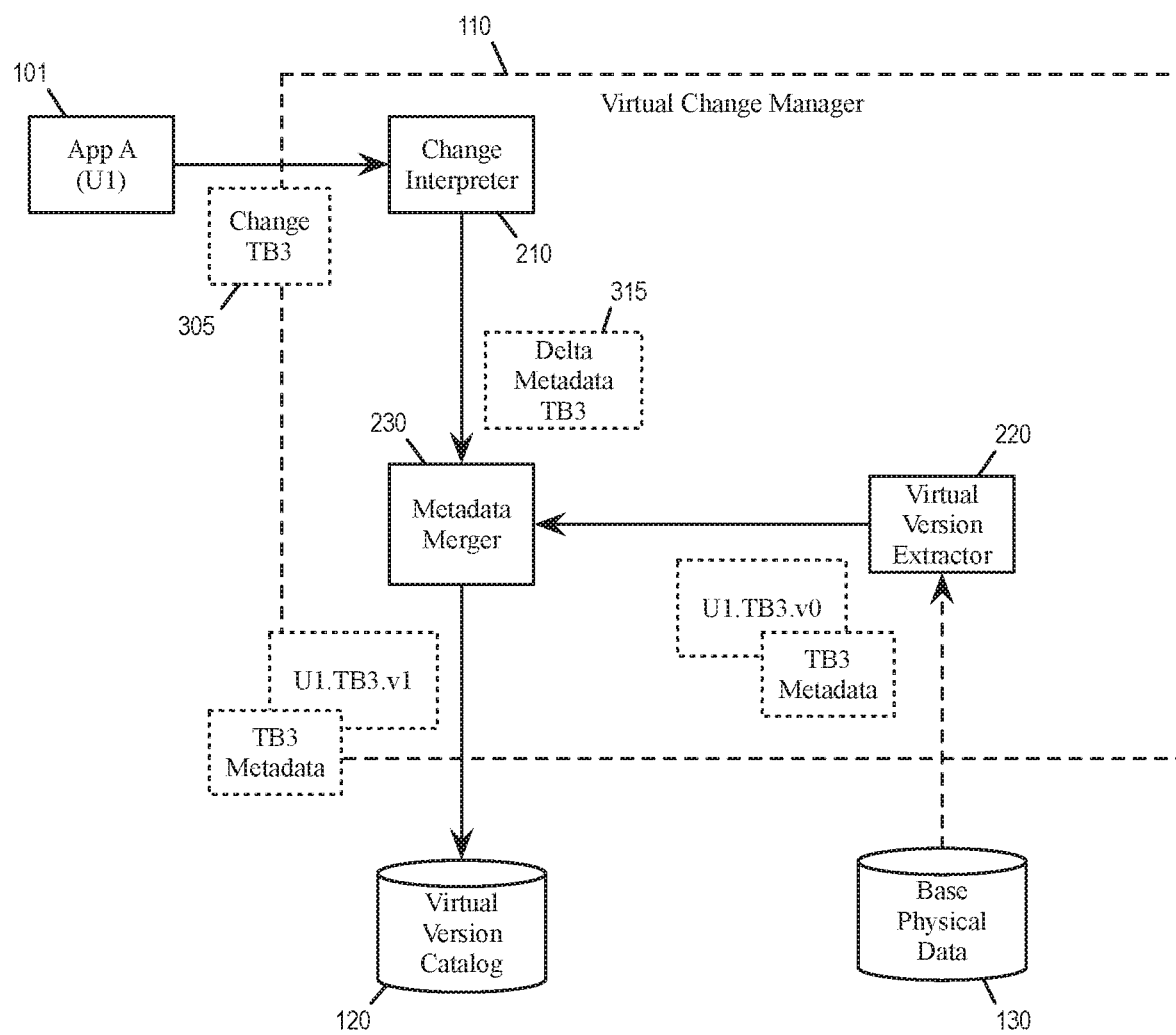
FIG. 3 conceptually illustrates the creation of a new virtual version for an object when the object does not have a virtual version registered in the catalog.

FIG. 3 conceptually illustrates the creation of a new virtual version for an object when the object does not have a virtual version registered in the catalog 120. As illustrated, the virtual change manager 110 receives a request 305 from the application 101 (App A) for modifying the database object TB3 for the user U1. According to the example illustrated in FIG. 1 above, the database system 100 does not have a virtual version for TB3 for the user U1 stored in the catalog 120.

The change interpreter 210 interprets the change request 305 and generates a delta metadata 315 for TB3, which specifies metadata for object TB3. The virtual change manager 110 determines that there is no existing virtual version for TB3 for user U1 in the virtual version catalog 120 so the virtual version extractor 220 creates a base virtual version U1.TB3.v0 with a base metadata for TB3 (based on content of original TB3 in the base physical data 130). The metadata merger 230 merges the delta metadata 315 with the base virtual version U1.TB3.v0 to create a new virtual version U1.TB3.v1 with metadata for TB3 that is based on the change request 305. The new virtual version U1.TB3.v1 and the base virtual version U1.TB3.v0 are stored in or registered with the catalog 120.

The virtual change database system 100 allows different developers to create their own schemas for database without affecting other developers by allowing each developer to work with his or her own virtual versions. In some embodiments, the virtual change database system 100 also allows different developers to make virtual changes to the data content of the database. The data content changes by each database application are maintained at a temporary physical data storage associated with the database application so the testing of the different database applications can occur concurrently without affecting each other. As illustrated in FIG. 1, the virtual change manager 110 stores changes made to the data content of the database by the database application 101-104 in corresponding temporary physical tables 131-134, respectively. The content of the temporary physical table may be discarded or integrated into the base physical table 130 at the discretion of the database administrator (e.g., based on result of testing.)

In some embodiments, the virtual change database system performs checks on the virtual changes made by each database application 101-104. The virtual change data system may issue an error code to the database application or to a user interface of a developer application. This gives the developer of a database application an opportunity to validate the virtual changes before deciding whether a specific set of virtual changes to the database is ready for integration with the underlying base physical data 130 of the database.

The developer of the database application is therefore free to make virtual changes to the database system and check the validity of those virtual changes without affecting other database applications and without actual changes to the base physical data 130.

Figure 4:
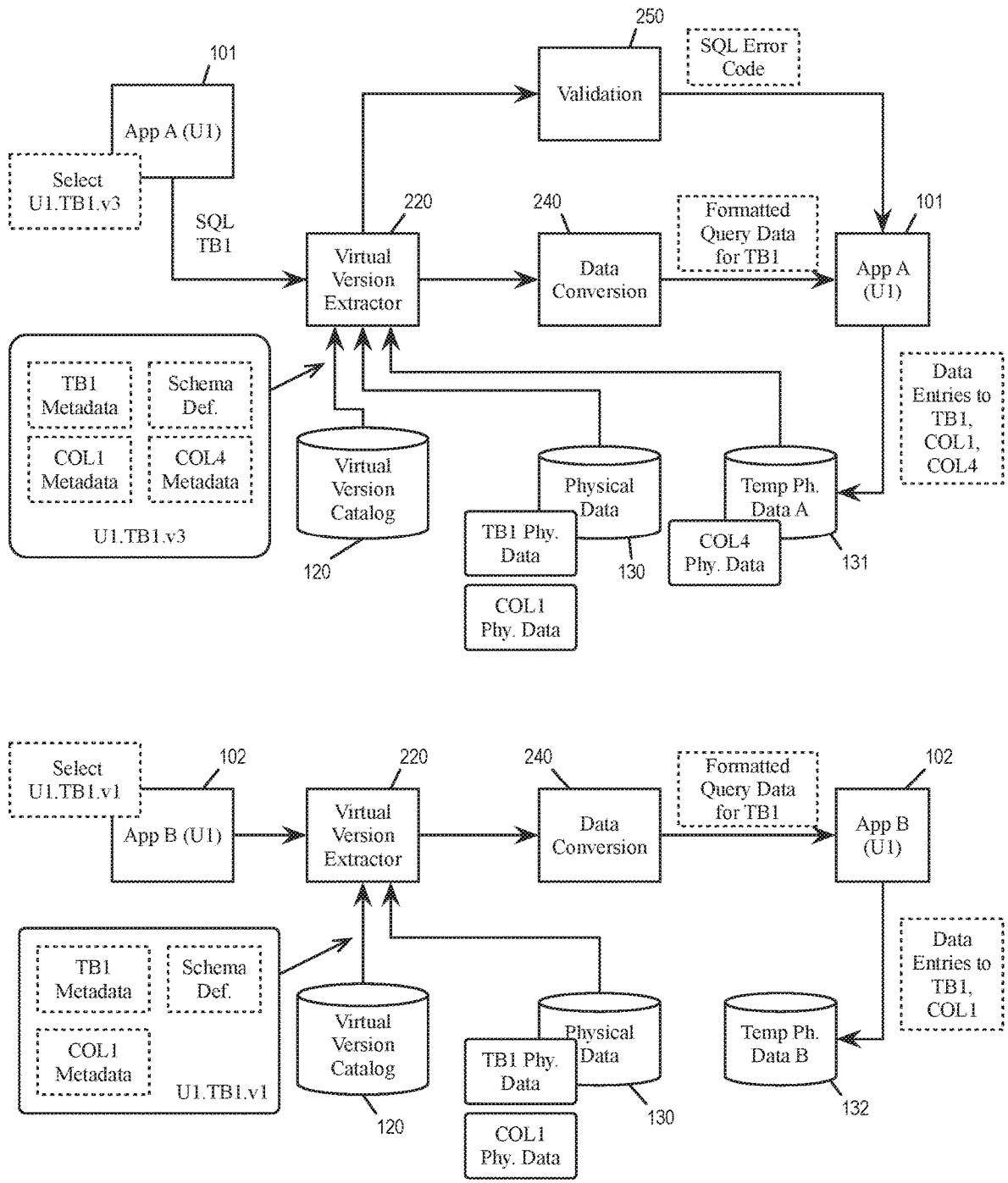
FIG. 4 illustrates the operations of a database application based on its virtual changes, consistent with an exemplary embodiment of the disclosure.

FIG. 4 illustrates the operations of a database application based on its virtual changes, consistent with an exemplary embodiment of the disclosure. The figure illustrates query and data entry operations by concurrent database applications based on virtual changes stored as virtual versions and temporary physical data. The figure also illustrates checking the validity of the request for the database operation, which can be used to test the correctness of the database application making the request.

As illustrated, the database application 101 (App A) is performing a database operation based on the virtual version U1.TB1.v3. The database application 102 (App B) is performing a database operation based on the virtual version U1.TB1.v1. Each database application selects a virtual version to use by setting a global variable. The virtual versions are registered with the catalog 120. The database operations can be a structured query language (SQL) queries or data insertion into objects (tables, columns, etc.,) of the database.

For database application 101 (App A), the virtual version extractor 220 extracts schema of the virtual version U1.TB1.v3 from the catalog 120 and the data content from the base physical data 130 and the temporary physical data 131. As illustrated, the schema of virtual version U1.TB1.v3 includes objects TB1, COL1, and COL4. The virtual version extractor extracts the corresponding data of TB1 and COL1 from the base physical data 130 and the corresponding data of COL4 from the App A's temporary physical data 131. (According to the example of FIG. 2, COL4 is a new object that has no corresponding data in the base physical data 130; its data content is temporarily stored in App A's temporary physical data 131.)

A data converter 240 formats the extracted data for presentation to App A as e.g., response to database query. In the meantime, a validation process 250 (a software module of the virtual change manager 110) also checks the syntax of the database operation against the extracted virtual version for errors. If there is an error, the validation process 250 sends an error code to App A or to a developer interface of App A. Though not illustrated, in some embodiments, the virtual changes to the data content of TB1 and COL1 may be stored in the temporary physical data 131 such that the virtual version extractor 220 extracts the corresponding virtual changes from the temporary physical data 131. Validation will be further described by reference to FIG. 6 below.

For the database application 102 (App B), the virtual version extractor 220 extracts schema of the virtual version U1.TB1.v1 from the catalog 120 and the data content from the base physical data 130 and the temporary physical data 132 for App B. As illustrated, the schema of virtual version U1.TB1.v1 includes objects TB1 and COL1. The virtual version extractor extracts the corresponding data content of TB1 and COL1 from the base physical data 130. The data converter 240 formats the extracted data content for presentation to App B. Though not illustrated, in some embodiments, there may be virtual changes to the data content of TB1 and COL1 stored in the temporary physical data 132 such that the virtual version extractor 220 extracts the corresponding virtual changes for TB1 and COL1 from the temporary physical data 132.

In some embodiments, the virtual change manager stores data entries from database applications in their respective temporary physical storages as virtual changes. As illustrated in FIG. 4, data entries from App A to the virtual version U1.TB1.v3 (for objects TB1, COL1, COL4) are stored in the temporary physical data 131. Data entries from App B to the virtual version U1.TB1.v1 (for objects TB1, COL1) are stored in the temporary physical data 132. These changes are made without changes to the set of base physical data 130.

In some embodiments, the virtual change manager 110 performs data conversion (at the data converter 240 and/or the virtual version extractor 220) by performing the following: (1) retrieving a data row into a memory from the base physical data 130; (2) extracting the definition of the columns of the base version from the catalog 120; (3) interpreting the retrieved base physical data according to the definition of the columns; (4) extracting the definition of the columns of the virtual version from the catalog 120; and (5) extracting, converting, removing, and appending certain bytes of data from/to the copied data row in the memory according to the column definition of the virtual version.

FIG. 5 illustrates example operations of the virtual change database system with example metadata in virtual versions. Specifically, the figure shows the virtual change manager altering a table in a existing virtual version (U1.TB1.v2) to drop an existing column and to add a new column, creating a new virtual version of the table (U1.TB1.v3), then running application against the new virtual version.

As illustrated, in the example virtual version U1.TB1.v2, TB1 is defined as a 3 columns table: COL1 with CHAR(2), COL2 with INTEGER, and COL3 with CHAR(10). The virtual change manager 110 receives a change request/delta metadata 505 from the database application 101 that modifies TB1 into a different 3 column table: COL1 CHAR(2), COL3 CHAR(10), COL4 CHAR(5) with default value "abcde". The virtual change manager 110 extracts the 1-2 bytes and the 7-16 bytes of each qualified row, append another 5 bytes with default value "abcde" and then return the result to the database application. The new virtual version is registered with the catalog 120.

The figure also illustrates a database update operation while using or testing the virtual version U1.TB1.v3. The application 101 issues a SQL command 510 to the virtual change manager 110 (using the virtual version extractor 220) to retrieve qualified rows (COL1='A2') from the physical data of TB1 (from base physical data 130), extracts the 1-2 bytes and the 7-16 bytes of each row, updates the value of the 7-16 bytes, appends another 5 bytes with value "CHINA", writes the updated rows to the temporary physical data 131. The virtual change manager 110 also checks the validity of the SQL command 510 against the extracted virtual version U1.TB1.v3 and then returns SQLCODE to the application 101.

FIG. 6 illustrates the generation of a new virtual version based on example delta metadata, consistent with an exemplary embodiment. Specifically, the figure shows a new virtual version being generated to alter a table to add a primary key. The figure shows an example change request that adds a primary key to U1.TB1.v2 using COL1. The change request is interpreted (by the change interpreter 210) into the delta metadata 215, which specifies that a primary key to be added (ADD_PK) with COL1 as target. The virtual change manager 110 (at the metadata merger 230) merges the delta metadata 215 with the metadata of TB1 in the virtual version U1.TB1.v2 to create the new virtual version U1.TB1.v3. The new virtual version U1.TB1.v3 has the added primary key at COL1.

A developer may then run a database application (e.g., the application 101) using the new virtual version U1.TB1.v3. Below is an example operation to insert data into the table TB1:

INSERT INTO U1.TB1.v3 VALUES ('A2', 100, 'Manager');

INSERT INTO U1.TB1.v3 VALUES ('A2', 200, 'Developer');

The virtual change manager 110 would validate the insert statements against the virtual version U1.TB1.v3. The second INSERT will fail with SQLCODE −803 as COL1 is the primary key column that cannot have rows with the same value. With the error SQLCODE returned, a developer of the database application is able to verify that the database application is correctly written to handle this error code and provide correct response. While the database application is working with this virtual version (U1.TB1.v3), other applications working with the virtual change database system 100, including those working with various versions of U1.TB1, will be not be affected, since the data insertion statement erroneous insertion statement is a virtual change being made to a temporary physical data (e.g. 131), not the base physical data 130 of the entire database. After testing to validate the database application, a database administrator may integrate the virtual change to the base physical data 130 for all database applications and all developers.

Figure 7:
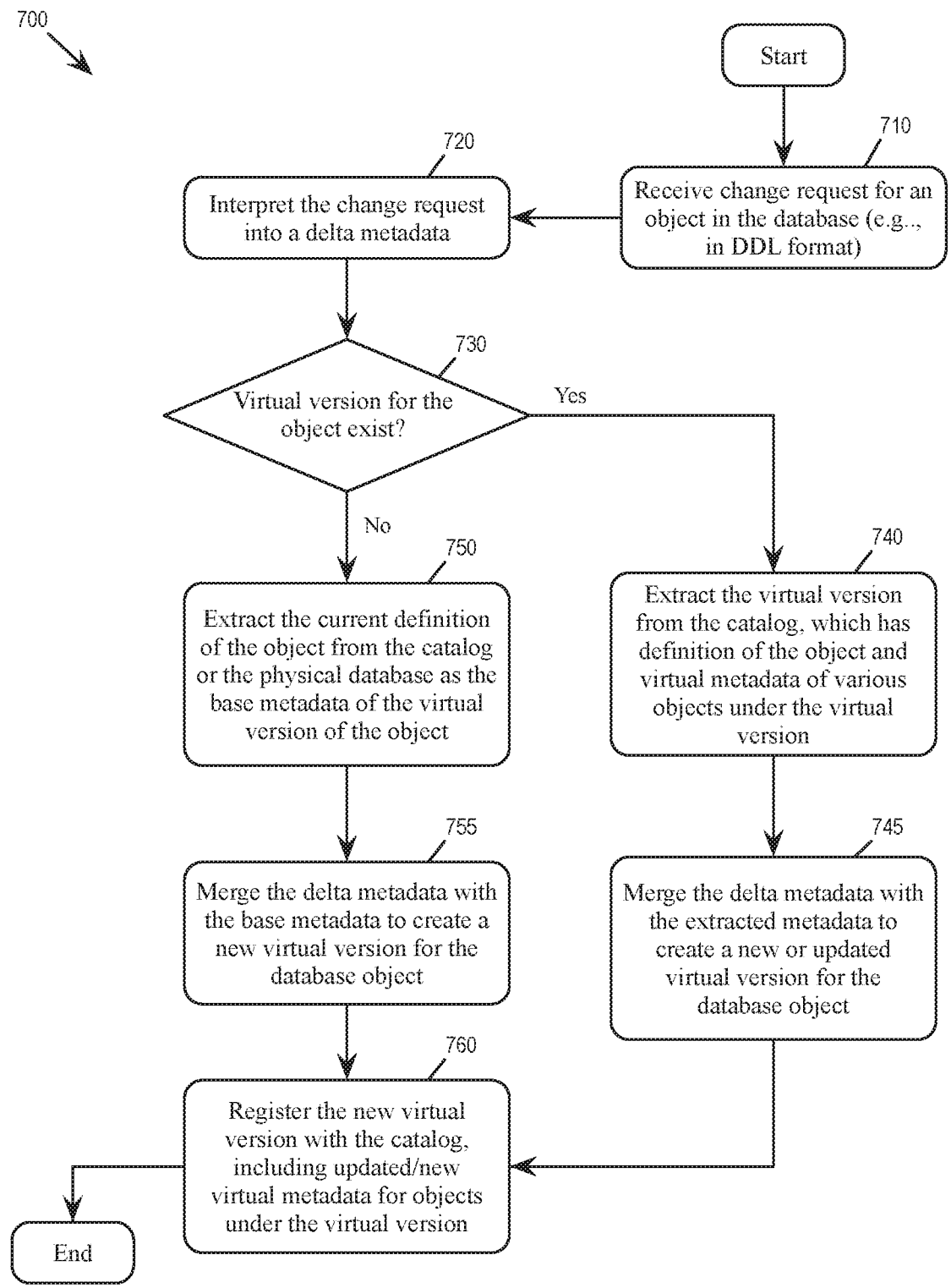
FIG. 7 conceptually illustrates a process for creating a new virtual version based on a change request, consistent with an exemplary embodiment.

FIG. 7 conceptually illustrates a process 700 for creating a new virtual version based on a change request, consistent with an exemplary embodiment. In some embodiments, one or more processing units (e.g., processor) of a computing device that implements the virtual change manager 110 performs the process 700 by executing instructions stored in a computer readable medium.

The process 700 starts when the virtual change manager 110 receives a change request for an object in the virtual change database system 100. In some embodiments, such a request may be in Data Definition Language (DDL) format. Examples of such requests include request to add a column to a table, to remove a column from a table, shuffle sequence of columns in a table, changing length or width of a column, changing a type of a column (or other attributes of the column), adding primary key to a table, dropping primary key from a table, or other types of operations for modifying a schema of the database.

The virtual change manager interprets (at 720) the change request into a delta metadata. The virtual change manager also determines (at 730) whether there is an existing virtual version for the object being requested. If so, the process proceeds to 740. If no virtual version exists for the requested object, the process proceeds to 750.

At 740, the virtual change manager extracts the virtual version from the catalog. The virtual version has definition of the object and virtual metadata of various objects under the virtual version. The virtual manager then merges (at 745) the delta metadata with the virtual metadata of the extracted virtual version to create a new or updated virtual version of the object. Merging delta metadata to create a new virtual version is described by reference to FIG. 2 and FIG. 6 above. The process then proceeds to 760.

At 750, the virtual change manager extracts the current definition of the object from the catalog or the physical database since no virtual version exists for the requested object. The current definition is made into a base metadata of a new virtual version of the object. The virtual manager then merges (at 755) the delta metadata with the virtual metadata of the base metadata to create a new virtual version for the object. Creating a new virtual version based on a base metadata and delta metadata is described by reference to FIG. 3 above. The process then proceeds to 760.

At 760, the virtual change manager registers or stores the new virtual version with or in the catalog. The new virtual version includes updated or new virtual metadata for objects under the new or updated virtual version. When a new base metadata is created for an object, the base metadata is also stored into the catalog as a base virtual version. The process 700 then ends.

Figure 8:
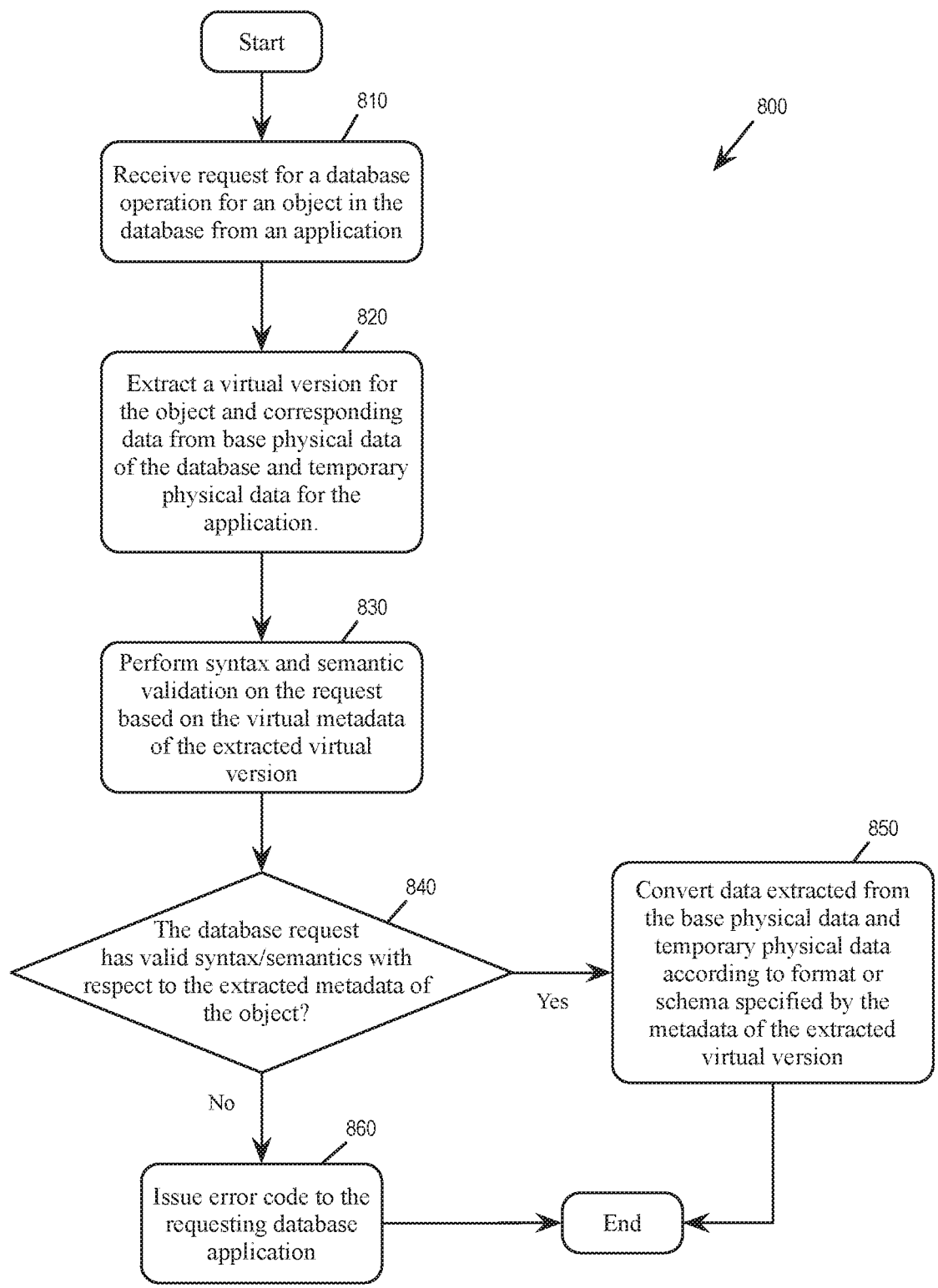
FIG. 8 conceptually illustrates a process for performing a database operation and checking the validity of the request for the database operation, consistent with an exemplary embodiment.

FIG. 8 conceptually illustrates a process 800 for performing a database operation and checking the validity of the request for the database operation, consistent with an exemplary embodiment. In some embodiments, one or more processing units (e.g., processor) of a computing device that implements the virtual change manager 110 performs the process 800 by executing instructions stored in a computer readable medium.

The process 800 starts when the virtual change manager 110 receives (at 810), from a database application, a request for a database operation for a specified virtual version of an object in the database system 100. Such a request can be a SQL query, a data entry, or other types of database operation.

The virtual change manager then extracts (at 820) a virtual version for the object and corresponding data from the base physical data of the database (e.g., 130) and temporary physical data of the application (e.g., 131 for the database application 101). The schema definition of the object is extracted from the virtual version registered with the virtual version catalog 120.

The virtual change manager then performs (at 830) syntax and semantic validation on the request for the database operation based on the virtual metadata in the extracted virtual version. The virtual change manager then determines (at 840) whether the request for database operation has valid syntax/semantics with respect to the extracted virtual version. If the request has valid syntax with respect to the extracted virtual version, the virtual manager converts (850) data from the base physical database and/or the corresponding temporary physical database according to schema or formats specified by the metadata of the extracted virtual version. If the request has invalid syntax/semantics, the virtual manager issues (at 860) an error code to the requesting database application. The process 800 then ends. The developer of the requesting application may determine the correctness of the application based on the error code before allowing the application to perform action that may adversely affect the entire database system as well as other users/applications of the database system.

Example Electronic System

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIGS. 7 and 8) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
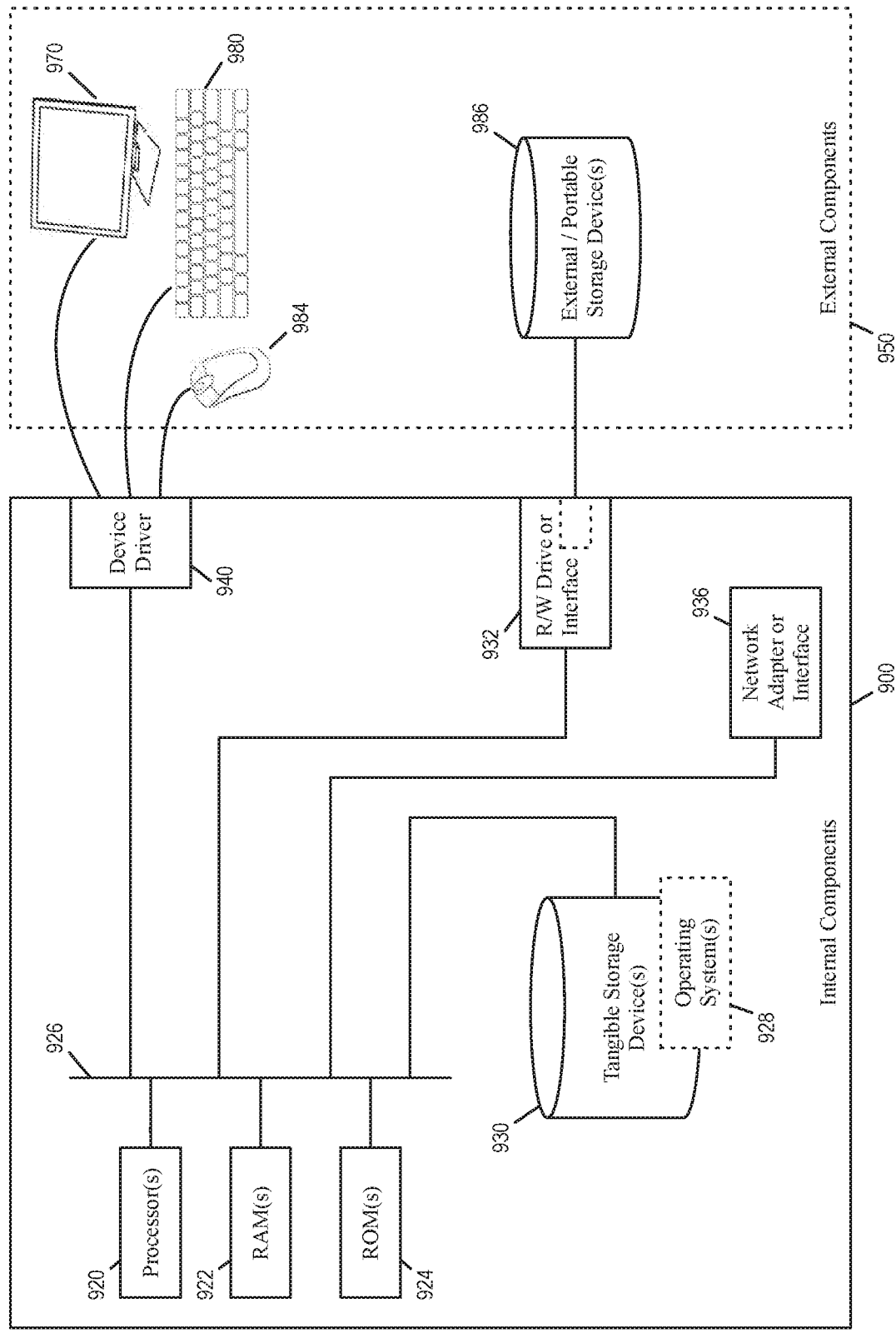
FIG. 9 shows a block diagram of the components of a data processing system in accordance with an illustrative embodiment of the present disclosure.

FIG. 9 shows a block diagram of the components of data processing systems 900 and 950 that may be used to implement virtual change manager of a database system in accordance with an illustrative embodiment of the present disclosure. It should be appreciated that FIG. 9 provides only an illustration of one implementation and does not imply any limitations with regard to the environments in which different embodiments may be implemented. Many modifications to the depicted environments may be made based on design and implementation requirements.

Data processing systems 900 and 950 are representative of any electronic device capable of executing machine-readable program instructions. Data processing systems 900 and 950 may be representative of a smart phone, a computer system, PDA, or other electronic devices. Examples of computing systems, environments, and/or configurations that may represented by data processing systems 900 and 950 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 900 and 950 may include a set of internal components 900 and a set of external components 950 illustrated in FIG. 9. The set of internal components 900 includes one or more processors 920, one or more computer-readable RAMs 922 and one or more computer-readable ROMs 924 on one or more buses 926, and one or more operating systems 928 and one or more computer-readable tangible storage devices 930. The one or more operating systems 928 and programs such as the programs for executing the processes 700 and 800 are stored on one or more computer-readable tangible storage devices 930 for execution by one or more processors 920 via one or more RAMs 922 (which typically include cache memory). In the embodiment illustrated in FIG. 9, each of the computer-readable tangible storage devices 930 is a magnetic disk storage device of an internal hard drive. Alternatively, each of the computer-readable tangible storage devices 930 is a semiconductor storage device such as ROM 924, EPROM, flash memory or any other computer-readable tangible storage device that can store a computer program and digital information.

The set of internal components 900 also includes a R/W drive or interface 932 to read from and write to one or more portable computer-readable tangible storage devices 986 such as a CD-ROM, DVD, memory stick, magnetic tape, magnetic disk, optical disk or semiconductor storage device. The instructions for executing the processes 800 and 900 can be stored on one or more of the respective portable computer-readable tangible storage devices 986, read via the respective R/W drive or interface 932 and loaded into the respective hard drive 930.

The set of internal components 900 may also include network adapters (or switch port cards) or interfaces 936 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 936. From the network adapters (or switch port adaptors) or interfaces 936, the instructions and data of the described programs or processes are loaded into the respective hard drive 930. The network may comprise copper wires, optical fibers, wireless transmission, routers, firewalls, switches, gateway computers and/or edge servers.

The set of external components 950 can include a computer display monitor 970, a keyboard 980, and a computer mouse 984. The set of external components 950 can also include touch screens, virtual keyboards, touch pads, pointing devices, and other human interface devices. The set of internal components 900 also includes device drivers 940 to interface to computer display monitor 970, keyboard 980 and computer mouse 984. The device drivers 940, R/W drive or interface 932 and network adapter or interface 936 comprise hardware and software (stored in storage device 930 and/or ROM 924).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing a database comprising a set of database objects, the method comprising:
   storing a set of base physical data for the database;
   storing a plurality of sets of virtual changes for the database objects, each set of virtual changes associated with a database object;
   presenting a first query response to a first application based on the set of base physical data and a first set of virtual changes associated with a particular database object;
   receiving a change request to the database from the first application that affects the particular database object;
   determining a validity of the change request from the first application;
   implementing the change request to a temporary physical data without affecting the base physical data; and
   presenting a second query response to a second application based on the set of base physical data and a second, different set of virtual changes associated with the particular database object,
   wherein a set of virtual changes for a database object comprises changes to schema of the database stored as a virtual version of the database object,
   wherein, for each virtual version of the database object, the physical data of the database object is not physically stored, and
   wherein the base physical data is not changed.

2. The computer-implemented method of claim 1, further comprising:
   creating a third set of virtual changes for the particular object based on the received change request; and
   presenting a third query response based on the set of base physical data and the third set of virtual changes for the particular object.

3. The computer-implemented method of claim 2, further comprising:
   issuing an error notification to the first application when the change request is not valid.

4. The computer-implemented method of claim 2, wherein creating the third set of virtual changes for the particular object comprises:
   generating a delta metadata based on the received change request; and
   merging the generated delta metadata with a metadata of the particular object.

5. The computer-implemented method of claim 1, wherein a virtual version of a database object comprises:
   (i) references to a set of objects in the database, and
   (ii) metadata of the referenced objects.

6. The computer-implemented method of claim 1, wherein the set of virtual changes for a database object further comprises changes to a data content of the database stored as a set of temporary physical data.

7. The computer-implemented method of claim 1, wherein virtual versions of database objects are registered as a catalog of virtual versions.

8. The computer-implemented method of claim 1, wherein:
   the data object is a table, and
   the set of virtual changes comprises adding a column to or deleting a column from the table.

9. The computer-implemented method of claim 1, wherein at least one set of virtual changes from the plurality of sets of virtual changes comprises adding to the database a database object that does not have corresponding data content in the base physical data.

10. A computing device for managing a database comprising a set of database objects, the computing device comprising:
a set of processing units;
a first storage device storing (i) a set of base physical data for the database and (ii) a plurality of sets of virtual changes for the database objects, each set of virtual changes being associated with a database object; and
a second storage device storing a set of instructions,
wherein an execution of the set of instructions by the set of processing units configures the computing device to perform acts, comprising:
presenting a first query response to (i) a first application based on the set of base physical data and (ii) a first set of virtual changes for a particular database object from the set of database objects;
receiving a change request to the database from the first application that affects the particular database object;
determining a validity of the change request from the first application;
implementing the change request to a temporary physical data without affecting the base physical data; and
presenting a second query response to (i) a second application based on the set of base physical data and (ii) a second, different set of virtual changes for the particular database object,
wherein a set of virtual changes for a database object comprises changes to schema of the database stored as a virtual version of the database object,
wherein, for each virtual version of the database object, the physical data of the database object is not physically stored, and
wherein the base physical data is not changed.

11. The computing device of claim 10 is further configured to perform acts comprising:
creating a third set of virtual changes for the particular database object based on the received change request; and
presenting a third query response based on the set of base physical data and the third set of virtual changes for the particular database object.

12. The computing device of claim 11 is further configured to perform acts comprising:
issuing an error notification to the first application when the change request is not valid.

13. The computing device of claim 11, wherein creating the third set of virtual changes for the particular database object comprises:
generating a delta metadata based on the received change request; and
merging the generated delta metadata with a metadata of the particular database object.

14. A computer program product for managing a database comprising a set of database objects, the computing program product comprising:
one or more non-transitory computer-readable storage device and program instructions stored on at least one of the one or more non-transitory storage devices, the program instructions executable by a processor, the program instructions comprising sets of instructions for:
accessing a set of base physical data for the database;
accessing a plurality of sets of virtual changes for the set of database objects, each set of virtual changes associated with a database object of the set of database objects;
presenting a first query response to (i) a first application based on the set of base physical data and (ii) a first set of virtual changes for a particular database object of the set of database objects;
receiving a change request to the database from the first application that affects the particular database object;
determining a validity of the change request from the first application;
implementing the change request to a temporary physical data without affecting the base physical data; and
presenting a second query response to (i) a second application based on the set of base physical data and (ii) a second, different set of virtual changes, for the particular database object,
wherein a set of virtual changes for a database object comprises changes to schema of the database stored as a virtual version of the database object,
wherein, for each virtual version of the database object, the physical data of the database object is not physically stored, and
wherein the base physical data is not changed.

15. The computer program product of claim 14, wherein a virtual version of a database object of the set of database objects comprises:
(i) references to a set of objects in the database; and
(ii) metadata of the referenced objects.

16. The computer program product of claim 14, wherein the set of virtual changes for a database object further comprises changes to a data content of the database stored as a set of temporary physical data.

17. The computer program product of claim 14, wherein:
the data object is a table, and
the set of virtual changes comprises adding a column to or deleting a column from the table.

18. The computer program product of claim 14, wherein at least one set of virtual changes of the plurality of sets of virtual changes comprises adding to the database a database object that does not have corresponding data content in the base physical data.

* * * * *